United States Patent
Takee et al.

(10) Patent No.: US 6,368,748 B1
(45) Date of Patent: Apr. 9, 2002

(54) NICKEL-METAL HYDRIDE STORAGE CELL HAVING A HIGH CAPACITY AND AN EXCELLENT CYCLE CHARACTERISTIC AND MANUFACTURING

(75) Inventors: Masao Takee, Naruto; Motoo Tadokoro; Tadashi Ise, both of Tokushima; Akifumi Yamawaki, Naruto, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/531,600

(22) Filed: Mar. 20, 2000

Related U.S. Application Data

(63) Continuation of application No. 08/824,612, filed on Mar. 27, 1997, now abandoned.

(30) Foreign Application Priority Data

Mar. 27, 1996 (JP) ................................. 8-99421

(51) Int. Cl.⁷ ................................. H01M 4/52
(52) U.S. Cl. ................ 429/223; 429/206; 429/232
(58) Field of Search ................ 429/223, 206, 429/232

(56) References Cited

U.S. PATENT DOCUMENTS

| | | |
|---|---|---|
| 4,312,928 A | 1/1982 | Van Deutekom |
| 5,079,110 A | 1/1992 | Nakahori et al. |
| 5,405,714 A | 4/1995 | Terasaka et al. |
| 5,518,509 A | 5/1996 | Tadokoro et al. |
| 5,629,111 A * | 5/1997 | Yamawaki et al. ......... 429/223 |
| 5,688,616 A * | 11/1997 | Yamawaki et al. ......... 429/223 |

FOREIGN PATENT DOCUMENTS

EP 0 757 395 5/1997

* cited by examiner

*Primary Examiner*—Carol Chaney
(74) *Attorney, Agent, or Firm*—Foley & Lardner

(57) ABSTRACT

A nickel-metal hydride storage cell is composed of a non-sintered positive electrode which is filled with a nickel active material whose particles are coated with cobalt compound layers of divalent or greater and a metal hydride electrode which is filled with a surface-treated hydrogen-absorbing alloy. In the cell, the positive electrode non-reactive capacity rate (represented by the Equation 1) and the negative electrode charge depth (represented by the Equation 2) after the initial charge/discharge are 16% or lower, and 80% or lower, respectively. This construction makes it possible to take larger actual cell capacity by setting the value of the negative electrode charge depth to the degree which causes no rise in the cell internal pressure, thereby expanding the capacity of the cell.

positive electrode non-reactive capacity rate %=(positive electrode theoretical capacity−actual cell capacity)/positive electrode theoretical capacity×100    Eq. 1;

negative electrode charge depth %=(negative electrode remaining capacity+actual cell capacity)/negative electrode whole capacity×100    Eq. 2.

13 Claims, 7 Drawing Sheets a: nickel hydroxide non-charge/discharge capacity
b: actual cell capacity
c: nickel hydroxide non-discharge capacity
d: cobalt compound non-discharge capacity
x: negative electrode excess capacity
y: negative electrode remaining capacity a; nickel hydroxide non-charge/discharge capacity
b; actual cell capacity
c; nickel hydroxide non-discharge capacity
d; cobalt compound non-discharge capacity
x; negative electrode excess capacity
y; negative electrode remaining capacity

NICKEL-METAL HYDRIDE STORAGE CELL HAVING A HIGH CAPACITY AND AN EXCELLENT CYCLE CHARACTERISTIC AND MANUFACTURING

This Application is a Continuation of application Ser. No. 08/824,612, filed on Mar. 27, 1997 and now abandoned.

BACKGROUND OF THE INVENTION (1) Field of the invention

The present invention relates to a nickel-metal hydride storage cell, and more particularly to a nickel-metal hydride storage cell which employs a positive electrode containing a nickel hydroxide active material whose particles are coated with a cobalt compound and a negative electrode containing a hydrogen-absorbing alloy, and a manufacturing method of the cell.

(2) Description of the Related Art

A nickel positive electrode for use in a nickel-metal hydride storage cell can be either a sintered type or a paste type (non-sintered type). The sintered type is produced by filling a nickel powder-sintered substrate with an active material, whereas the paste type is produced by filling a highly porous nickel substrate such as a nickel fiber-sintered porous member or a foam nickel porous member with an active material paste.

The sintered type has drawbacks that the filing operation of an active material is complicated and that it is hard to enhance the energy density of the electrode because there are limits to an increase in the porosity of the substrate. In contrast, the paste type is easy to handle, which allows a high-density filling. For this reason, the paste type nickel electrode has become the mainstream, as the demand for higher energy density and lower cost of cells grows.

In spite of these advantages, however, the paste type nickel electrode has the following disadvantages: the electric contact between the active material and the substrate is insufficient because the pores in the substrate have large diameters. Consequently, the electrode has poor efficiency in electricity collection, and the generating ability of the high-density active material cannot be fully brought out.

In order to overcome these drawbacks of the paste type nickel positive electrode, various techniques have been suggested as follows: (1) Japanese Laid-open Patent Application No. 62-222566 discloses a technique of forming cobalt hydroxide layers over the surfaces of solid solution active material powder particles containing nickel hydroxide and either cadmium hydroxide or cobalt hydroxide. (2) Japanese Laid-open Patent Application No. 3-62457 discloses a technique of forming a solid solution of nickel hydroxide and cobalt hydroxide onto the surfaces of nickel hydroxide particles. (3) Japanese Laid-open Patent Application No. 5-151962 discloses a technique of forming hydrophilic organic layers onto the cobalt compound-coated layers which are formed onto the nickel hydroxide power particles, as an improved technique of the above-mentioned Japanese Laid-open Patent Application No. 62-222566.

These techniques have successfully improved the electric conductivity among active material particles and increased the active material utilization rate of the nickel positive electrode, thereby expanding the capacity of the nickel positive electrode. However, the expansion of the nickel positive electrode capacity does not directly lead to the improvement of the performance of an alkali-nickel storage cell. The reason for this is as follows.

As the active material utilization rate grows, the actual capacity of the positive electrode expands. However, when this positive electrode is used with a conventional negative electrode, the excess capacity (charge reserve) of the negative electrode reduces in proportion to the expansion of the actual capacity of the positive electrode. Consequently, more hydrogen dissociates from the negative electrode during a charging operation, which causes the internal pressure of the cell to be raised. Furthermore, the negative electrode performance deteriorates with the progress of the charge/discharge cycle, and the domination of the positive electrode is easily collapsed. The increase in dissociated hydrogen and the collapse of the positive electrode control cause the safety valve to operate to release the electrolyte to the outside the storage cell, thereby deteriorating the cycle life of the cell.

Therefore, in order to lead the expansion of the capacity of a nickel positive electrode to the improvement of the performance of a alkaline nickel storage cell, it is necessary to employ a negative electrode which is suitable for the performance of the nickel positive electrode, and to balance the capacities of these electrodes.

SUMMARY OF THE INVENTION

The object of the present invention is to provide a nickel-metal hydride storage cell which has a large actual capacity and excellent cycle characteristics, and restricts a rise in the cell internal pressure during a charging operation, by using a nickel positive electrode having a high active material utilization rate and a hydrogen-absorbing alloy electrode which has an excellent low-temperature discharge characteristic, and by balancing these electrodes.

In order to achieve the object, the nickel-metal hydride storage cell of the present invention comprises a non-sintered nickel positive electrode which is filled with a cobalt-coated nickel active material including mother particles exclusively or mainly composed of nickel hydroxide, and cobalt compound layers partly or entirely coating the surfaces of the mother particles; a metal hydride negative electrode which is filled with a hydrogen-absorbing alloy which absorbs and desorbs hydrogen; and an electrolyte which includes an alkali aqueous solution. In the nickel-metal hydride storage cell, a positive electrode non-reactive capacity rate is 16% or lower and a negative electrode charge depth is 80% or lower after an initial charge/discharge operation.

The positive electrode non-reactive capacity rate is determined by a following equation 1:

positive electrode non-reactive capacity rate %=(positive electrode theoretical capacity−actual cell capacity)/positive electrode theoretical capacity×100     Eq. 1.

The negative electrode charge depth is determined by a following equation 2:

negative electrode charge depth %=(negative electrode remaining capacity+actual cell capacity)/negative electrode whole capacity×100     Eq. 2.

The nickel-metal hydride storage cell of the present invention can be manufactured by a method comprising the following four steps: a first step of producing a cobalt-coated nickel active material by dispersing mother particles exclusively or mainly consisting of nickel hydroxide into a cobalt compound-contained solution, and by precipitating a cobalt compound by adding an alkali solution to the cobalt compound-contained solution with a pH value being adjusted; a second step of applying a heat treatment to the cobalt-coated nickel active material by adding an alkali metal solution to the cobalt-coated nickel active material and by heating the cobalt-coated nickel active material in a presence of oxygen; a third step of producing a non-sintered nickel positive electrode whose non-reactive capacity rate expressed by the Equation 1 is 16% or lower, by using the cobalt-coated nickel active material containing the cobalt compound which has been heat-treated in the second step; a fourth step of assembling a nickel-metal hydride storage cell whose negative electrode charge depth expressed by Equation 2 after an initial charge/discharge operation is restricted to 80% or lower, by using the non-sintered nickel electrode and a metal hydride negative electrode which is filled with a hydrogen-absorbing alloy.

The present invention will be detailed hereinafter, based on the above-explained method of manufacturing a nickel-metal hydride storage cell.

In the first step, nickel mother particles are dispersed into a solution which contains a cobalt compound, and the pH of this solution is adjusted to a predetermined value. As a result, the cobalt compound is precipitated in the manner that it coats the surfaces of the nickel mother particles.

In the second step, the nickel mother particles which have been coated with the cobalt compound precipitate is soaked in an alkali metal solution, and heat-treated in the presence of oxygen. As a result, the oxidation number of the cobalt contained in the cobalt coating layer becomes greater, and at the same time, its crystalline structure is disordered. Thus, a cobalt-coated nickel active material has excellent electric conductivity and electrolysis perviousness.

In the third step, the cobalt-coated nickel active material is used to fill a porous nickel substrate, thereby producing a non-sintered nickel positive electrode whose non-reactive capacity rate which is represented by the Equation 1 is 16% or lower. Since the cobalt-coated nickel active material has excellent electric conductivity and electrolyte perviousness and high electrochemical activity, the use of this active material makes it possible to obtain a positive electrode whose non-reactive capacity rate is 16% or lower The value of the actual cell capacity which appears in the Equation 1 was found in a positive electrode-controlled cell system, and the value of the positive electrode theoretical capacity was obtained from the Equation 3 under the conditions that the valence of nickel hydroxide changes between divalence and trivalence in the charge/discharge reaction with the capacity per unit weight of 289 mAh/g.

Positive electrode theoretical capacity=289 mAh/g×the amount (g) of nickel hydroxide in the positive electrode    Eq. 3

In the fourth step, a nickel-metal hydride storage cell whose negative electrode charge depth represented by the Equation 2 is restricted to 80% or below is produced by using the non-sintered nickel positive electrode, together with a hydrogen-absorbing alloy electrode (metal hydride negative electrode) and an alkali electrolyte. The storage cell thus produced has the following features.

When the negative electrode charge depth is 80% or below, the negative electrode excess capacity is sufficient, so that less hydrogen gas dissociates from the negative electrode during a charging operation. Consequently, the hydrogen gas pressure is not strong enough to cause the safety valve to operate, and as a result, there is no deterioration of the cell performance or the cycle characteristic due to a reduction in the electrolyte.

Thus, the present invention combines a high-performing nickel positive electrode whose non-reactive capacity rate is 16% or lower with a hydrogen-absorbing alloy electrode which can restrict its charge depth to 80% or below. The combination makes it possible to expand the actual cell capacity and to restrict the occurrence of hydrogen gas at the negative electrode, thereby realizing a cell with a high capacity and a long cycle life.

Such a construction of the present invention will be further detailed as follows with reference to FIG. 1.

FIG. 1 shows the capacity construction of a storage cell. In FIG. 1 the positive electrode theoretical capacity is represented as the sum of the nickel hydroxide non-charge/discharge capacity (a), the actual cell capacity (b), and the nickel hydroxide non-discharge capacity (c). The negative electrode whole capacity is represented as the sum of the negative electrode excess capacity (x), the actual cell capacity (b), and the negative electrode remaining capacity (y). The negative electrode remaining capacity CV) consists of $y_1$ and $y_2$. The $y_1$ corresponds to the nickel hydroxide non-discharge capacity (c) and the cobalt compound non-discharge capacity (d), whereas the $y_2$ indicates the capacity due to the oxidation reaction other than positive electrode one.

The nickel hydroxide non-charge/discharge capacity (a) indicates volume which is used neither for charge nor discharge. The nickel hydroxide non-discharge capacity (c) and the cobalt compound non-discharge capacity (d) indicate volume which is used for charge but not for discharge. However, the cobalt compound non-discharge capacity (d) indicates the charge capacity (oxidation capacity) of the cobalt compound that is added for the purpose of improving the active material utilization rate and does not contribute to the discharge, so that it is excluded from the positive electrode theoretical capacity.

Since the cobalt contained in the cobalt-coated nickel active material of the present invention has become higher-order through an alkali heat treatment, only small power is demanded during a charging operation. Furthermore, the cobalt coating layer containing the high-order cobalt compound has high conductivity and excellent wettability against an electrolyte due to its disordered crystalline structure. Consequently, the cobalt-coated nickel active material has a high utilization rate, and the nickel positive electrode which is filled with such as cobalt-coated nickel active material has a low non-reactive capacity rate. Thus, in FIG. 1 the nickel hydroxide non-charge/discharge capacity (a), the nickel hydroxide non-discharge capacity (c), and the cobalt compound non-discharge capacity (d) can be reduced whereas the actual cell capacity (b) can be expanded in the present invention. To be more specific, the positive electrode non-reactive capacity rate which is defined in the Equation 1 can be set at 16% or lower, and as a result, the nickel positive electrode has an extremely high electrode capacity.

We inventors of the present invention have confirmed that in the conventional non-sintered nickel positive electrode which is filled with an active material containing a mere mixture of nickel hydroxide and cobalt compound powder, the non-reactive capacity rate is 19.0% or higher.

If a cell is manufactured by using the high-performing nickel positive electrode whose non-reactive capacity rate is 16% or lower and the conventional negative electrode, then the nickel hydroxide non-charge/discharge capacity (a), the nickel hydroxide non-discharge capacity (c), and the cobalt compound non-discharge capacity (d) are reduced and the actual cell capacity (b) is expanded, and accordingly, the negative electrode excess capacity (x) and the negative electrode remaining capacity (y) are reduced. The reduction in the negative electrode excess capacity (x) and the negative electrode remaining capacity (y) is preferable itself because it works to draw out the negative electrode performance to the full.

However, if the high-performing positive electrode of the present invention and the conventional negative electrode are simply combined, the positive electrode capacity and the negative electrode capacity become similar to each other. As a result, more hydrogen dissociates from the negative electrode during a charging operation and the domination of the positive electrode in the cell might be destroyed due to a slight deterioration of the negative electrode. Consequently, the improvement of the nickel positive electrode performance does not lead to the improvement of the cell performance.

In the present invention, however, the cell is so constructed that the negative electrode charge depth which is represented by the Equation 2 becomes 80% or lower. With this charge depth, the negative electrode excess capacity (x) is sufficient, so that the hydrogen gas pressure is not strong enough to cause the safety valve to operate. In addition, the deterioration of the negative electrode does not directly lead to the collapse of the domination of the positive electrode. As a result, the deterioration of the cycle characteristic resulting from the operation of the safety valve can be prevented.

As explained hereinbefore, the nickel-metal hydride storage cell of the present invention is composed of a high-performing nickel positive electrode whose non-reactive capacity rate is 16% or lower and a hydrogen-absorbing alloy negative electrode whose charge depth can be properly regulated. This combination of the electrodes can fully draw out the ability of the high-performing nickel positive electrode without causing the occurrence of hydrogen gas dissociation. As a result, a nickel-metal hydride storage cell with a high capacity and an excellent cycle life can be obtained.

Furthermore, the present invention may have another construction as follows:

In the second step, the average valence of the cobalt compound which is contained in the cobalt coating layer is set at greater than divalence. When the cobalt-coated nickel active material contains a cobalt compound whose average valence is greater than divalence, the active material utilization rate can be improved without fail because of its excellent conductivity, and the charging efficiency of the electrodes is improved because the cobalt compound consumes less charging power during a charging operation.

In the third step, the negative electrode non-discharge capacity is set at 40% or lower of the actual cell capacity, and a hydrogen-absorbing alloy which has been surface-treated with an acid aqueous solution is used as the negative electrode active material. In this construction, a decrease in the low-temperature discharge characteristic can be reduced because of the following reason.

As explained above, when the average valence of the cobalt compound is larger than divalence, the cobalt consumes less charging power whereas the cobalt-coated nickel active material becomes more conductive. As a result, the nickel hydroxide non-discharge capacity (c) and the cobalt compound non-discharge capacity (d) of the positive electrode are reduced, and the negative electrode remaining capacity (y) is also reduced. In order to obtain sufficient volume of the actual discharge capacity, it is preferable for the negative electrode remaining capacity to be smaller. However, the hydrogen-absorbing alloy which is used as the negative electrode active material loses its electrochemical reactivity more easily at a low temperature than the nickel active material which is used for the positive electrode.

Therefore, when the negative electrode remaining capacity is set at too small a degree, the cell becomes controlled by the negative electrode during a discharging operation at a low temperature. Consequently, sufficient discharging capacity cannot be taken out, that is, the performance of the nickel positive electrode cannot be fully drawn out.

We inventors of the present invention have found through examinations that the negative electrode remaining capacity is about 42% of the actual cell capacity in this type of conventional cell, and that when the negative electrode remaining capacity is 40% or less of the actual cell capacity, the low-temperature discharge characteristic has a problem. Based on the results, we have tried various measures for improving the low-temperature discharge characteristic of a hydrogen-absorbing alloy electrode. As a result, we have found that a hydrogen-absorbing alloy electrode which is filled with a hydrogen-absorbing alloy whose surface has been treated with an acid aqueous solution is suitable for the high-performing nickel electrode which is filled with the cobalt-coated nickel active material. We also have found that the combination of these electrodes makes it possible to maintain an excellent low-temperature discharge characteristic even if the negative electrode remaining capacity (v) is 40% or lower of the actual cell capacity (b).

To be more specific, when a hydrogen-absorbing alloy is subjected to a surface treatment by using an acid aqueous solution whose pH value is within a range of 0.5 to 3.5, its activity and low-temperature discharge performance are enhanced. Consequently, the use of such a hydrogen-absorbing alloy as the negative electrode prevents the low-temperature discharge characteristic from being severely deteriorated even if the negative electrode remaining capacity (y) is 40% or lower of the actual cell capacity (b). In short, a cell can have a high capacity without sacrificing the low-temperature discharge characteristic.

The reason for the enhancement of the low-temperature discharge characteristic through the treatment with an acid aqueous solution is believed to be that the oxide layers which are formed onto the surfaces of the hydrogen-absorbing alloy particles in the pulverizing process is washed out by the acid aqueous solution, and then catalytic-active metal isolation layers (nickel-rich layers) are formed on the surfaces of the alloy particles.

In the second step of the present invention, the alkali aqueous solution has concentrations within a range of 15 to 4 wt %. The alkali aqueous solution having this concentration has a suitable alkali strength and appropriate viscosity, so that it can penetrate through the cobalt-coated nickel active material particles. Consequently, the cobalt compound which is contained the cobalt coating layer can be evenly changed into a cobalt compound whose valence is larger than divalence.

In the alkali heat treatment, the preferable temperatures are within a range of 50 to 150° C. At this temperature, the cobalt compound in the cobalt coating layer can change into a high-order cobalt compound of divalent or greater without fail in the presence of oxygen and alkali. It is also possible to improve the crystalline structure of the nickel hydroxide in the cobalt coating layer.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 1:
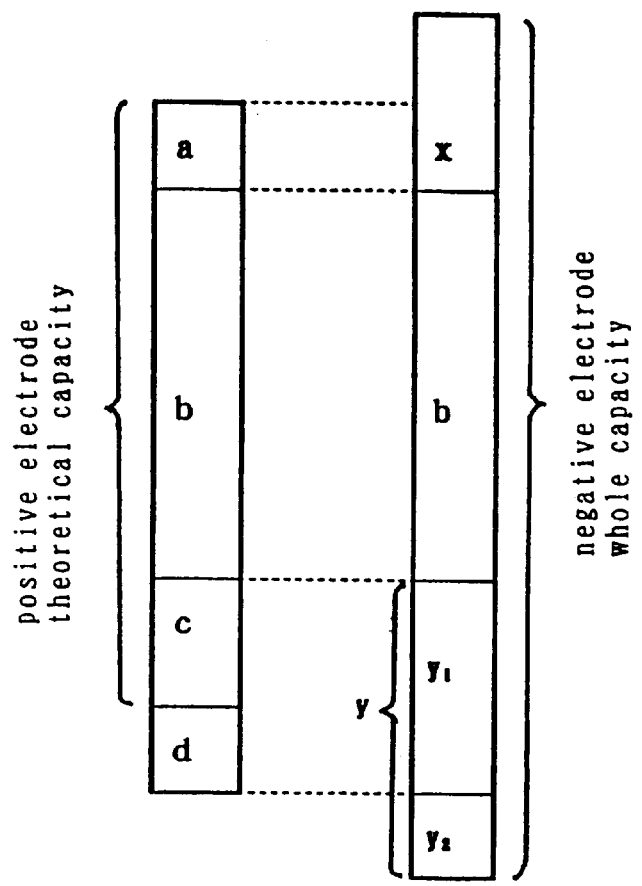
FIG. 1 shows the capacity construction of a storage cell.

The embodiments of the present invention will be explained hereinafter based on experiments and their results shown in FIGS. 2–7.

<Production of Positive Electrodes>

(1) Positive electrodes containing a cobalt compound which has not been heat-treated A 2 mol % zinc sulfate aqueous solution and a sodium hydroxide aqueous solution were gradually added to a nickel sulfate aqueous solution, with the pH being adjusted with ammonia water. As a result, nickel hydroxide powder in which 2 mol % of zinc was added in the state of a solid solution was precipitated.

A cobalt sulfate aqueous solution and a sodium hydroxide aqueous solution were added to the nickel hydroxide power thus precipitated, with the pH being adjusted at 10. As a result, cobalt compound layers were precipitated onto the particle surfaces of the nickel hydroxide power. The ratio of the cobalt compound to the nickel hydroxide was 10 mol %. Active material whose powder particles were coated with a cobalt compound was obtained after being washed with water and dried.

Then, 100 parts of the cobalt-coated active material thus obtained was mixed with 50 parts of an aqueous solution in which 0.2 parts of hydroxypropyl cellulose was dissolved, so as to obtain an active material slurry. The slurry was used to fill a foam nickel having a porosity of 95% and a thickness of 1.6 mm. The foam nickel was dried and pressed to form six nickel electrodes having a thickness of 0.6–0.7 mm. These six nickel electrodes contain different amounts of active materials from each other.

The nickel electrodes thus produced are hereinafter referred to as the positive electrodes p1–p6, respectively.

(2) A positive electrode containing a cobalt compound which has been heat-treated in the air Another nickel positive electrode was produced in the same manner as in the above-explained (1) except the cobalt-coated active material was subjected to a heat treatment at 100° C. in the air.

The nickel electrode thus produced is hereinafter referred to as the positive electrode p7.

(3) Positive electrodes containing a cobalt compound which has been heat-treated in the presence of oxygen and alkali Nine different nickel positive electrodes were produced in the same manner as in the above-explained (1) except the cobalt-coated active materials were subjected to a heat treatment in the following manner: Each of the sodium hydroxide aqueous solutions which had different concentrations from each other was added to the cobalt-coated active material and then heat-treated for 30 minutes at a respective temperature in the presence of oxygen gas, washed with water, and dried.

The nickel electrodes thus produced are hereinafter referred to as the positive electrodes p8–p16, respectively.

(4) A positive electrode containing a merely added cobalt compound power

Another nickel positive electrode was produced in the same manner as in the above-explained (1) except that the cobalt-coated nickel active material was prepared by mixing 90 parts of the nickel hydroxide powder in which 2 mol % zinc was added in the state of a solid solution with 10 parts of cobalt hydroxide powder.

The nickel electrode thus produced is hereinafter referred to as the positive electrode p17.

Table 1 shows the conditions of the heat treatment for the positive electrodes p1–p16. Table 2 shows the discharge capacity per unit weight and the capacity of each of the positive electrodes p1–p6. Each positive electrode capacity (polar plate capacity) was determined as follows: A test cell was produced by using a positive electrode, a counter electrode made of a nickel plate, and a 30 wt % KOH aqueous solution. The cell was charged for 24 hours with a current of 120 mA, rested for one hour, and discharged with a current of 400 mA until the discharge end voltage became −0.8V against the nickel electrode. The discharge capacity at this moment was measured and regarded as the positive electrode capacity. The discharge capacity per unit weight was obtained by dividing the positive electrode capacity by the amount of the positive electrode active material.

TABLE 1

| | conditions of alkali heat treatment | | |
|---|---|---|---|
| positive electrodes | NaOH concentration (wt %) | heat treatment temperatures (° C.) | atmospheres |
| p1 | | no treatment | |
| p2 | | no treatment | |
| p3 | | no treatment | |
| p4 | | no treatment | |
| p5 | | no treatment | |
| p6 | | no treatment | |
| p7 | no addition | 100 | air |
| p8 | 10 | 100 | oxygen |
| p9 | 15 | 100 | oxygen |
| p10 | 25 | 100 | oxygen |
| p11 | 40 | 100 | oxygen |
| p12 | 45 | 100 | oxygen |
| p13 | 25 | 25 | oxygen |
| p14 | 25 | 50 | oxygen |
| p15 | 25 | 150 | oxygen |
| p16 | 25 | 175 | oxygen |
| p17 | mere addition of a cobalt compound no alkali heat treatment | | |

TABLE 2

| positive electrodes | discharge capacities per unit weight (mAh/g) | positive electrode capacities (mAh) |
|---|---|---|
| p1 | 226 | 1123 |
| p2 | 226 | 1198 |
| p3 | 226 | 1254 |

TABLE 2-continued

| positive electrodes | discharge capacities per unit weight (mAh/g) | positive electrode capacities (mAh) |
|---|---|---|
| p4 | 226 | 1291 |
| p5 | 226 | 1321 |
| p6 | 226 | 1345 |

<Production of Negative Electrodes>

(1) Negative electrodes containing a hydrogen-absorbing alloy which has not been surface-treated with acid Commercially available Misch metal (Mm), nickel (Ni), cobalt (Co), aluminum (Al), and manganese (Mn) were weighed to be in an elementary ratio 1:3.4:0.8:0.2:0.6 and heated for 10 hours at 1000° C. in a high-frequency melting furnace. As a result, a hydrogen-absorbing alloy ingot expressed by $MmNi_{3.4}Co_{0.8}Al_{0.2}Mno._6$ was produced. Misch metal is a mixture of rare-earth elements such as lanthanum (La), cerium (Ce), neodymium (Nd), praseodymium (Pr), and the like.

The alloy ingot was mechanically pulverized into powder in an argon atmosphere, and classified by using a 100-mesh sieve whose lattice spaces were 150 $\mu$m and a 500-mesh sieve whose lattices spaces were 25 $\mu$m.

Each of these classified alloy powders was mixed with a binder such as polytetrafluoroethylene and some water, and formed into a hydrogen-absorbing alloy paste. The paste was spread onto both surfaces of a punching metal and pressed. As a result, six different hydrogen-absorbing alloy electrodes which had a thickness of 0.4–0.5 mm and different capacities from each other were produced.

These six hydrogen-absorbing alloy electrodes are hereinafter referred to as the negative electrodes n1–n6, respectively.

Table 3 shows the discharge capacity per unit weight and the negative electrode capacity of each of the negative electrodes n1–n6.

TABLE 3

| negative electrodes | discharge capacities per unit weight (mAh/g) | negative electrode capacities (mAh) |
|---|---|---|
| n1 | 299 | 2465 |
| n2 | 299 | 2375 |
| n3 | 299 | 2285 |
| n4 | 299 | 2241 |
| n5 | 299 | 2137 |
| n6 | 299 | 2150 |

(2) Negative electrodes containing a hydrogen-absorbing alloy which has been surface-treated with acid Six different hydrogen-absorbing alloy electrodes were produced in the same manner as in the above-explained (1) except that the classified hydrogen-absorbing alloy powers were subjected to a surface treatment with acid as follows:

The classified hydrogen-absorbing alloy powders were soaked in 100 wt % acid solutions which had different pH values from each other, and reacted in an agitator until the pH values reached 7. After discarding the solutions, 100 wt % pure water was poured in the agitator. After washing the alloy powder with the water for 10 minutes, the water was discarded and the alloy powder was dried in a vacuum. As a result, six different surface-treated alloy powders were obtained.

These six hydrogen-absorbing alloy electrodes are hereinafter referred to as the negative electrodes n8–n13, respectively.

Table 4 shows the pH values in the surface treatment for these negative electrodes n8–n13.

TABLE 4

| negative electrodes | pH values in the surface treatment |
|---|---|
| n8 | 0 |
| n9 | 0.5 |
| n10 | 1 |
| n11 | 2 |
| n12 | 3.5 |
| n13 | 4 |

(Assembly of Cells)

Cells were manufactured as follows by using the positive electrodes p1–p16 and the negative electrodes n1–n13.

A positive electrode, a negative electrode, and a separator mainly composed of an unwoven cloth made of polyolefin resin fiber were cut into respective predetermined sizes. A positive electrode and a negative electrode were coiled with a separator in-between, and formed into a coiled electrode assembly. The electrode assembly was inserted into an outer can, which was sealed after an alkali electrolyte was poured thereinto. Thus, a cylindrical nickel-hydride storage cell was completed.

The positive electrodes and negative electrodes used for these cells are indicated in the corresponding tables.

<Experiment 1>

Cells A1–A3 of the present invention and Comparative Cells X1–X4 were manufactured by using the positive electrodes p1–p6 and p17 having different capacities and the negative electrodes n1–n6 having different capacities. As for each cell, the positive electrode non-reactive capacity rate, the negative electrode charge depth, the actual cell capacity, and the cell internal pressure were examined. The results are shown in Table 5 and FIG. 2.

The calculation and measurement of the actual cell capacity, the positive electrode non-reactive capacity rate, the negative electrode charge depth, and the cell internal pressure during a charging operation were conducted as follows.

(1) Actual cell capacity

The cells were charged for 16 hours with a current of 120 mA, rested for one hour, then discharged with a current of 240 mA until the discharge end voltage became 1.0 V, and rested for one hour. This cycle was repeated three times to activate the cells. The discharge capacity in the third cycle was measured and regarded as the actual cell capacity or the initial capacity.

(2) Positive electrode non-reactive capacity rate

The positive electrode non-reactive capacity rate was found by the following Equation 1.

positive electrode non-reactive capacity rate %=(positive electrode theoretical capacity−actual cell capacity)/positive electrode theoretical capacity×100      Eq. 1

In the Equation 1, the value of the actual cell capacity is found by the above-explained (1), and the positive electrode theoretical capacity is found by the Equation 3 under the conditions that the valence of nickel hydroxide as the active material changes between divalence and trivalence in the charge/discharge reaction and that the capacity per unit weight at this moment is 289 mAh/g.

Positive electrode theoretical capacity=289 mAh/g×the amount (g) of nickel hydroxide in the positive electrode      Eq. 3

(3) Negative electrode charge depth

The negative electrode charge depth was found by the following Equation 2.

negative electrode charge depth %=(negative electrode remaining capacity+actual cell capacity)/negative electrode whole capacity×100   Eq. 2

In order to measure the negative electrode whole capacity in the Equation 2, a cell for capacity measurement was produced as follows: 1.2 g of carbonyl nickel as a conductive agent and 0.2 g of polytetrafluoroethylene powder as a binder were added to 1 g of hydrogen-absorbing alloy powder and kneaded into an alloy paste. The alloy paste was wrapped in a nickel mesh and pressed to produce an electrode for capacity measurement. This electrode was put in a sealed can together with a non-sintered nickel electrode which had a larger capacity than the electrode for capacity measurement. An excessive amount of 30 wt % KOH was poured in the can as an electrolyte, to complete the cell for capacity measurement.

Then, the cell for capacity measurement thus produced was charged for 8 hours with a current of 50 mAb/g, rested for one hour, discharged with the same current of 50 mAh/g until the discharge end voltage reached 1.0 V. The discharge capacity was used to calculate the capacity per unit weight of alloy, and the capacity per unit weight of alloy was used to calculate the whole capacity of each of the hydrogen-absorbing alloy electrodes n1–n6 and n10–n13.

On the other hand, the negative electrode remaining capacity was measured by overcharging both negative and positive electrodes in a 30% KOH aqueous solution after each cell was activated under the same conditions as the measurement of the actual cell capacity (1). The overcharge was conducted with a current of 120 mA until the discharge end negative electrode potential reached −0.3 V (versus Hg/HgO electrode).

(4) Cell internal pressure during a charging operation

The cell internal pressure was measured by charging the cells which had been activated in the same conditions as in the measurement of the actual cell capacity (1) for one hour with a current of 1200 mA.

TABLE 5

| cells | positive electrodes | negative electrodes | positive electrode non-reactive capacity rates (%) | negative electrode charge depths (%) | actual cell capacities (mAh) | cell internal pressures (kgf/cm$^2$) |
|---|---|---|---|---|---|---|
| A1 | p1 | n1 | 14.8 | 64.5 | 1101 | 3.4 |
| A2 | p2 | n2 | 14.8 | 70.9 | 1174 | 3.2 |
| A3 | p3 | n3 | 15.4 | 76.7 | 1222 | 4.5 |
| X1 | p4 | n4 | 14.8 | 80.3 | 1266 | 6.2 |
| X2 | p5 | n5 | 15.7 | 84.4 | 1281 | 16.5 |
| X3 | p6 | n6 | 15.7 | 86.7 | 1304 | 19.2 |
| X4 | p17 | n4 | 19.0 | 79.6 | 1212 | 7.0 |

Figure 2:
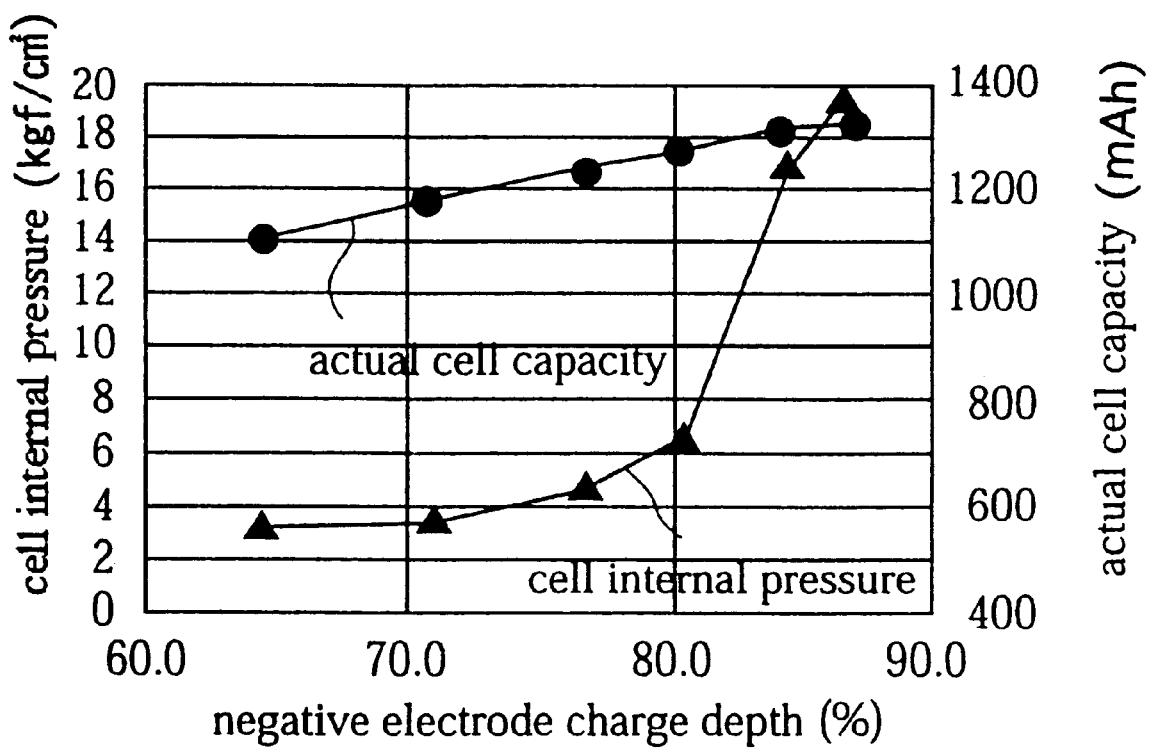
FIG. 2 is a graph which shows the relationship among the negative electrode charge depth, the cell internal pressure, and the actual cell capacity.

Table 5 and FIG. 2 indicate that in Cells A1–A3 of the present invention whose positive electrode non-reactive capacity rates are in a range of 14.8 to 15.4% and whose negative electrode charge depths are lower than 80%, the actual cell capacities are small but the cell internal voltages are very low. On the other hand, in Comparative Cells X1–X3 whose positive electrode non-reactive capacity rates are similar to those of Cells A1–A3 and whose negative electrode charge depths are over 80%, the cell internal pressures are high. Comparative Cells X2 and X3 whose negative electrode charge depths are over 84% have particularly high cell internal pressures.

The reason for this seems to be that Cells A1–A3 of the present invention have less hydrogen dissociation from the negative electrodes because the negative electrode charge depths are set at below 80%, whereas Comparative Cells X1–X3 have more hydrogen dissociation due to the high negative electrode charge depths.

On the other hand, in Comparative Cell X4 whose positive electrode non-reactive capacity rate is 19.0%, which is higher than those of Cells A1–A3 and X1–X3, the cell internal pressure is higher than those of cell A1–A3 of the present invention. The actual cell capacity of Comparative Cell X4 is smaller than that of Comparative Cell X1, which has the similar values in the negative electrode charge depth and the cell internal voltage to those of Comparative Cell X4.

Comparative Cell X4 employs a nickel active material to which cobalt compound powder is merely added. For Comparative Cell X4 to obtain the same actual capacity as Comparative Cell X1, it is necessary to increase the amount of the positive electrode active material because Comparative Cell X4 has a larger positive electrode non-reactive capacity rate than Comparative Cell X1. Assuming that Comparative Cells X4 and X1 have the same size, the amount of the negative electrode active material must be reduced for the increase in the positive electrode active material. However, in this case the negative electrode charge depth becomes larger than in the original Comparative Cell X4, and as a result, the cell internal pressure drastically rises. In short, a cell having an excellent actual capacity and a small internal pressure can be hardly obtained by using the positive electrode p17 whose positive electrode non-reactive capacity rate is 19.0%.

Considering the circumstances mentioned above, in order to obtain a cell which has a low internal pressure and a large actual capacity, it is necessary to employ a nickel positive electrode whose non-reactive capacity rate is lower than 19.0%, and more preferably 16% or lower, and to combine the positive electrode with a hydrogen-absorbing alloy negative electrode whose charge depth is 80% or below.

<Experiment 2>

With regard to the positive electrode p4 containing a non-heat-treated cobalt compound, the positive electrode p7 containing a cobalt compound which had been heat-treated in the air without using alkali, and the positive electrode p10 containing a cobalt compound which had been heat-treated in the presence of oxygen and alkali, the capacity per unit weight of an active material was measured. The results are shown in Table 6.

The measurement was conducted in the same manner as mentioned above as follows: A test cell was produced by using a positive electrode, a counter electrode made of a nickel plate, and a 30 wt % KOH aqueous solution. The cell was charged for 24 hours with a current of 120 mA, rested for one hour, and discharged with a current of 400 mA until the discharge end voltage became −0.8V against the nickel electrode. The discharge capacity at this moment was measured. The capacity per unit weight was obtained by dividing the discharge capacity by the amount of the positive electrode active material.

TABLE 6

| positive electrodes | heat treatment conditions | capacities per unit weight (mAh/g) |
| --- | --- | --- |
| p 4 | no treatment | 226 |
| p 7 | air + heat treatment | 178 |
| p10 | oxygen + alkali + heat treatment | 243 |

Table 6 indicates that the capacity per unit weight for the positive electrode p7 containing a cobalt compound which has been heat-treated in the air without alkali is 178 mAh/g, which is much smaller than in the other positive electrodes. The capacity per unit weight for the positive electrode p4 containing a non-heat-treated cobalt compound is 226 mAh/g. In contrast, the positive electrode p10 containing a cobalt compound which has been heat-treated in the presence of oxygen and alkali is as large as 243 mAh/g.

These results indicate that the alkali heat treatment works to reduce the nickel hydroxide non-charge/discharge capacity (a) and the nickel hydroxide non-discharge capacity (c) of a positive electrode shown in FIG. 1. Since the reduction in the nickel hydroxide non-charge/discharge capacity (a) and the nickel hydroxide non-discharge capacity (c) leads to a reduction in the negative electrode remaining capacity, the negative electrode charge depth is increased. As a result, a cell capacity is enlarged.

The reason for the results shown in Table 6 is believed to be as follows: In the positive electrode p4 containing a non-heat-treated cobalt compound, nickel hydroxide as the main component of the positive electrode active material cannot be fully deoxidized in the initial charge/discharge reaction. In addition, the cobalt compound added to improve the utilization rate of the positive electrode active material does not contribute to the discharge. Accordingly, the corresponding electric power is accumulated to the negative electrode.

In contrast, in the positive electrode p10 containing a cobalt compound which has been heat-treated with alkali, nickel hydroxide and a cobalt compound are chemically oxidized, (equivalent to charge) through the alkali heat treatment, so that the loss in the charging power in the initial charge/discharge operation is mitigated. Furthermore, the order of the cobalt compound is heightened through the alkali heat treatment and the conductivity of the cobalt layer is enhanced. As a result, the utilization rate of the cobalt-coated active material for the positive electrode is increased. Thus, the positive electrode p10 has a large capacity per unit weight because of its high charge/discharge efficiency.

On the other hand, the reason for the small capacity per unit weight of the positive electrode p7 containing a cobalt compound which has been heat-treated without alkali is believed to be that the absence of alkali causes the cobalt compound to have high crystallinity and as a result, to have less conductivity than disordered crystalline structure. Therefore, it is preferable for a heat treatment to be conducted in the presence of oxygen and alkali.

<Experiment 3>

In order to confirm the truth of the analysis on the results of Experiment 2, the actual cell capacities and the negative electrode remaining capacities of Cells A4 and A9 were measured in the same manner as in Experiment 1. Cells A4 and A9 were composed of the positive electrodes p4 and p10, respectively, and the negative electrode n4.

The results shown in Table 8 indicate that the actual cell capacity of Cell A9 is 1327 mAh, which is far larger than 1266 mAh of Cell A4., and the negative electrode remaining capacity of Cell A9 is 320 mAh, which is far smaller than 533 mAh of A4.

In accordance with the analysis on Experiment 2, it has turned out from these results that the heat treatment which is conducted in the presence of oxygen and alkali can decrease the negative electrode remaining capacity, and as a result, the capacity of a cell can be expanded.

<Experiment 4>

The difference in the crystallinity of the cobalt compounds which were used in the positive electrodes p4 and p10 was examined. The results are shown in FIG. 3.

The non-heat-treated cobalt compound which was used in the positive electrode p4 and the alkali heat-treated cobalt compound which was used in the positive electrode p10 were subjected to the X-ray diffraction analysis under the following conditions.

cathode: Cuk α tube voltage: 40 kV scan speed: 2.00°/minute tube current: 30 mA

Figure 3:
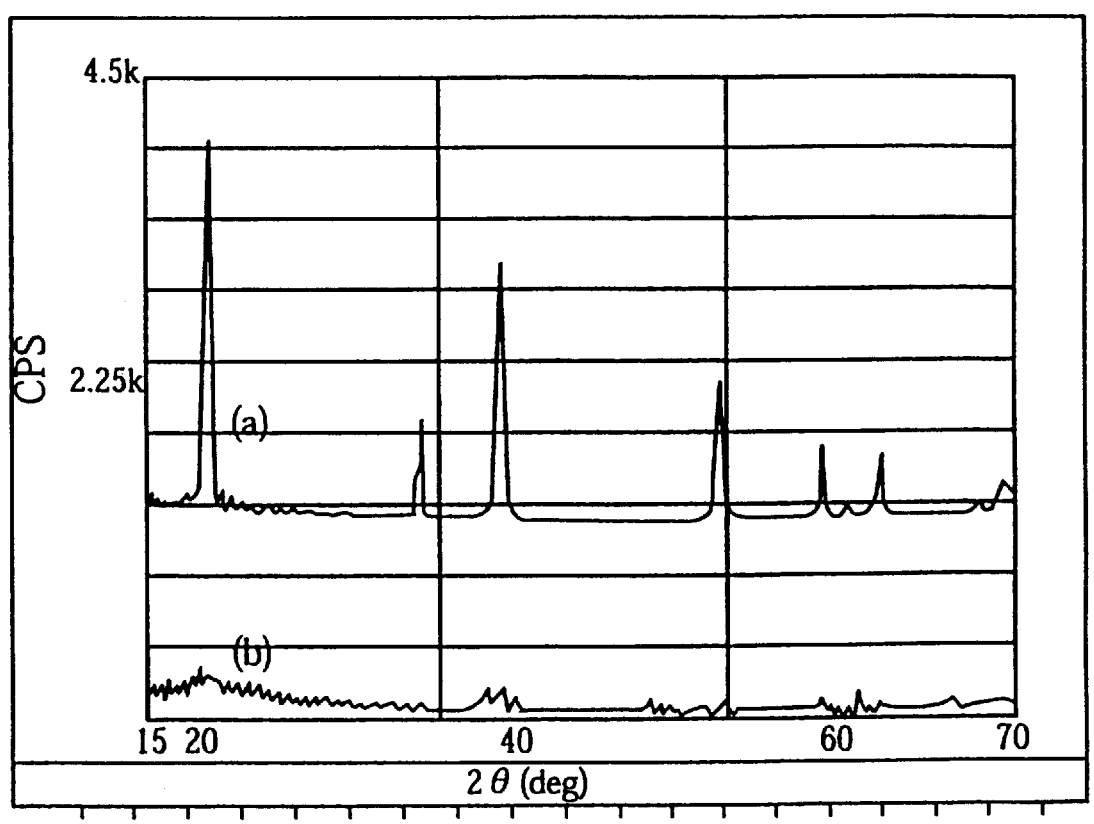
FIG. 3 is an X-ray chart of the two different cobalt compounds which are used for the positive electrodes p4 and p1, respectively.

The graph shown in FIG. 3 indicates that the non-heat-treated cobalt compound which is indicated by (a) has high crystallinity, whereas the heat-treated cobalt compound which is indicated by (b) has poor crystallinity.

<Experiment 5>

The positive electrode p4 containing a non-heat-treated cobalt compound and the positive electrode p10 containing a cobalt compound which had been heat-treated in the presence of oxygen and alkali were subjected to the atomic absorption spectrometry to examine the average valence of the cobalt which was contained in the cobalt coating layer formed onto the mother particles. The results are shown in Table 7.

The examination was conducted as follows: A sample material was weighed, dissolved in a concentrated hydrochloric acid solution, and the amount of cobalt contained in the solution was measured through the atomic absorption spectrometry. Since both divalent cobalt and trivalent cobalt are soluble in the hydrochloric acid, the amount of cobalt to be weighed corresponds to the entire cobalt, that is, the total of divalent cobalt and trivalent cobalt contained in the cobalt coating layer. This amount is referred to as A. Then, the same amount of the sample material was weighed and dissolved in a concentrated nitric acid solution. After filtering the solution, the amount of cobalt in the filtered solution was measured through the atomic absorption spectrometry. Since divalent cobalt dissolves in nitric acid, but trivalent cobalt does not, the filtered solution contains only divalent cobalt. Therefore, the amount of cobalt to be weighed corresponds to divalent cobalt only. This amount is referred to as B, and the average valence of cobalt contained in each sample material is found by the Equation 4.

$$\text{Average valence of cobalt} = (3A - B)/A \qquad \text{Eq.4}$$

TABLE 7

| | positive electrode p10 | positive electrode p4 |
| --- | --- | --- |
| cobalt valence | 2.9 | 2.0 |

Table 7 shows that in the positive electrode p10 containing a cobalt compound which has been heat-treated in the presence of oxygen and alkali, the valence of cobalt is 2.9, which is much higher than 2.0 in the positive electrode p4 containing a non-heat-treated cobalt compound.

Considering the results of Experiments 4 and 5, the reason for Cell A9 listed on Table 8 to have a high actual cell capacity is believed to be that the cobalt compound contained in the cobalt coating layer is chemically oxidized through the alkali heat treatment, and as a result, the average valence becomes larger than divalence and its crystal structure is disordered.

<Experiment 6>

The relationship among alkali concentration, the actual cell capacity, and the negative electrode remaining capacity was examined by using Cells A7–A11 containing cobalt compounds which had been heat-treated with different alkali concentrations from each other. The results are shown in Table 8 and FIG. 4.

The measurement of the actual cell capacity and the negative electrode remaining capacity was conducted in the same manner as in Experiment 1.

TABLE 8

| cells | P.E. | N.E. | NaOH concentration (wt %) | treatment temperature (° C.) | positive electrode non-reactive capacity rates (%) | negative electrode remaining capacities (mAh) | negative electrode charge depths (%) | actual cell capacities (mAh) |
|---|---|---|---|---|---|---|---|---|
| A7 | p8 | n4 | 10 | 100 | 21.0 | 537 | 76 | 1160 |
| A8 | p9 | n4 | 15 | 100 | 13.6 | 393 | 75 | 1282 |
| A9 | p10 | n4 | 25 | 100 | 8.6 | 320 | 73 | 1327 |
| A10 | p11 | n4 | 40 | 100 | 13.0 | 355 | 73 | 1288 |
| A11 | p12 | n4 | 45 | 100 | 21.6 | 483 | 73 | 1145 |
| A4 | p4 | n4 | no treatment | | 14.8 | 533 | 80 | 1266 |

Figure 4:
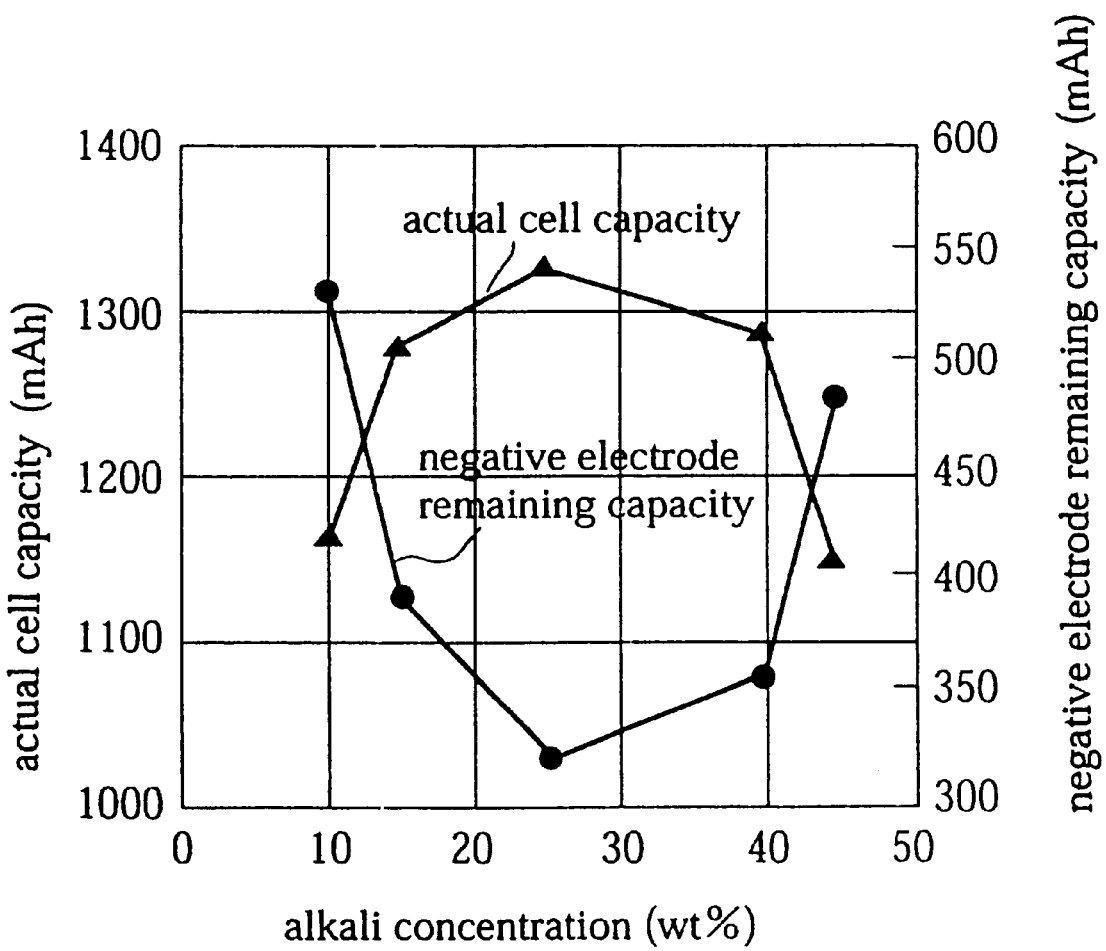
FIG. 4 is a graph which shows the relationship among the alkali concentration in the alkali heat treatment, the actual cell capacity, and the negative electrode remaining capacity.

*P.E. and N.E. indicate positive electrodes and negative electrodes, respectively Table 8 and FIG. 4 indicate that the negative electrode remaining capacities are small and the actual cell capacities are large when the alkali concentration are within a range of 15 to 40 wt %. Consequently, the preferable alkali concentrations for the heat treatment in the presence of oxygen and alkali are within a range of 15 to 40 wt %.

<Experiment 7>

The relationship among the heat treatment temperature, the actual cell capacity, and the negative electrode remaining capacity was examined by using Cells A12–A15 containing cobalt compounds which had been heat-treated at different temperatures from each other. The results are shown in Table 9 and FIG. 5.

The measurement of the actual cell capacity and the negative electrode remaining capacity was conducted in the same manner as in Experiment 1.

Figure 5:
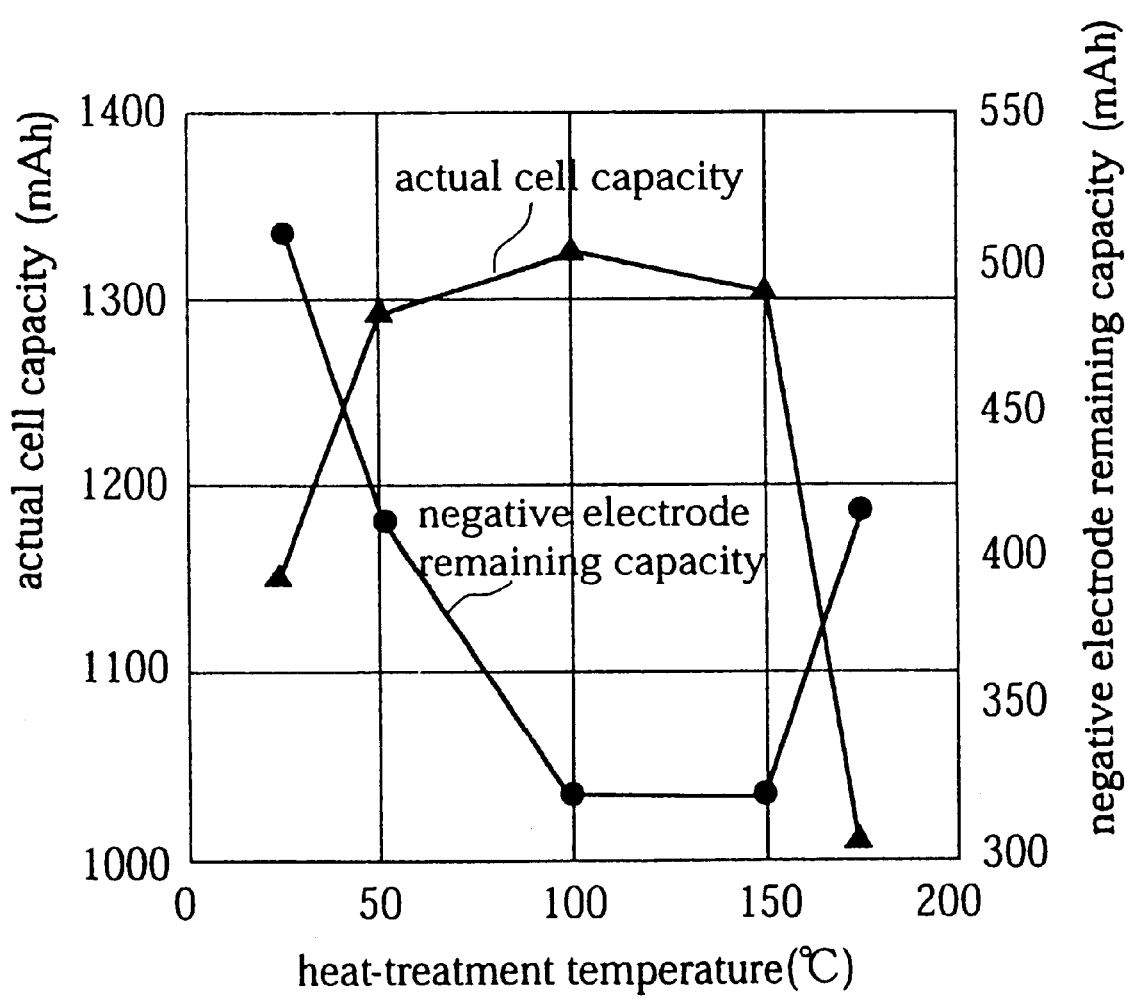
FIG. 5 is a graph which shows the relationship among the temperature of the alkali heat treatment, the actual cell capacity, and the negative electrode remaining capacity.

Table 9 and FIG. 5 indicate that the negative electrode remaining capacities are small and the actual cell capacities are large when the heat treatment temperature are within a range of 50 to 150° C. Consequently, the preferable temperatures for the heat treatment in the presence of oxygen and alkali are within a range of 50 to 150° C.

<Experiment 8>

The relationship between the ratio of the negative electrode remaining capacity to the actual cell capacity (hereinafter negative electrode remaining capacity rate) and the discharge rate at a low temperature (hereinafter low-temperature discharge rate), by using Cell A9 and A12–A15 which have different negative electrode remaining capacity rates from each other. The results are shown in Table 10 and FIG. 6 where there cells are indicated by the symbol ●.

The low-temperature discharge rate was found as follows: These cells were activated in the same conditions as in the measurement of the actual cell capacity in (1). Then, each cell was charged for 16 hours with a current of 120 mA, rested for one hour at −10° C., and discharged with a current of 1200 mA until the discharge end voltage became 1.0V. The rate of the discharge capacity to the cell initial capacity was regarded as the low-temperature discharge rate (%).

TABLE 9

| cells | p.e. | n.e. | NaOH concentration (wt %) | treatment temperature (° C.) | positive electrode non-reactive capacity rates (%) | negative electrode remaining capacities (mAh) | negative electrode charge depths (%) | actual cell capacities (mAh) |
|---|---|---|---|---|---|---|---|---|
| A12 | p13 | n4 | 25 | 25 | 21.7 | 511 | 74 | 1150 |
| A13 | p14 | n4 | 25 | 50 | 12.3 | 412 | 76 | 1295 |
| A9 | p10 | n4 | 25 | 100 | 8.6 | 320 | 73 | 1327 |
| A14 | p15 | n4 | 25 | 150 | 11.0 | 321 | 73 | 1305 |
| A15 | p16 | n4 | 25 | 175 | 30.3 | 416 | 63 | 1007 |
| A4 | p4 | n4 | no treatment | | 14.8 | 533 | 80 | 1266 |

*P.E. and N.E. indicate positive electrodes and negative electrodes, respectively

TABLE 10

| cells | positive electrodes | negative electrodes | negative electrode remaining capacity rates (%) | low-temperature discharge rates (%) |
|---|---|---|---|---|
| A12 | p13 | n4 | 44.4 | 78 |
| A13 | p14 | n4 | 31.8 | 43 |
| A9  | p10 | n4 | 24.1 | 35 |
| A14 | p15 | n4 | 24.6 | 38 |
| A15 | p16 | n4 | 41.4 | 72 |

Figure 6:
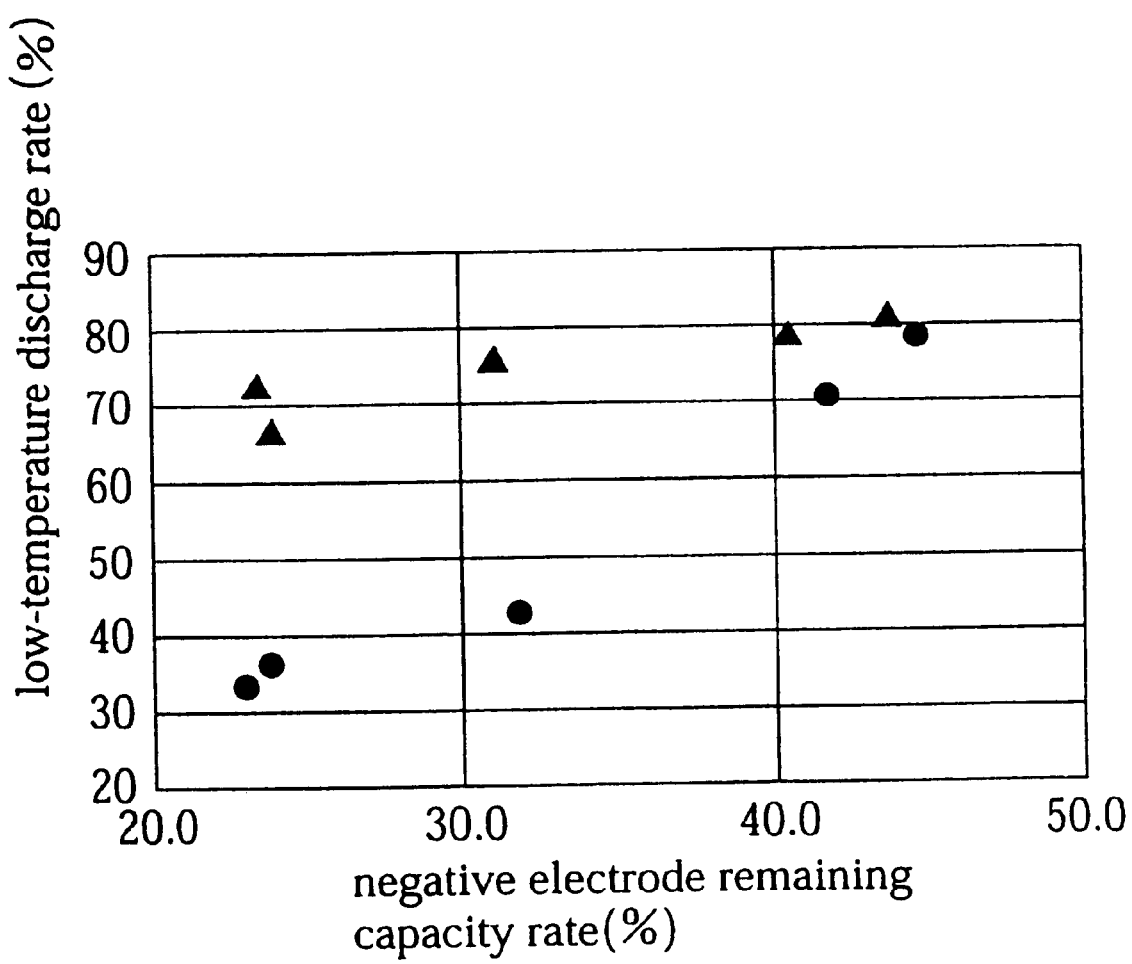
FIG. 6 is a graph which shows the relationship between the negative electrode remaining capacity rate and the low-temperature discharge rate.

Table 10 and FIG. 6 indicate that cells A9, A13, and A14 whose negative electrode remaining capacities are less than 40% have low temperature discharge rates. Thus, if the negative electrode remaining capacity rate is set at 40% or lower by setting the negative electrode charge depth at a low degree, then the cycle characteristic at a normal temperature is improved, but the low-temperature discharge characteristic deteriorates.

Experiment 9 was conducted to find a measure for the improvement of the low-temperature discharge characteristic.

<Experiment 9>

The relationship between the negative electrode remaining capacity rate and the low-temperature discharge rate was examined by using Cells A16–A20 which used a hydrogen-absorbing alloy that had been surface-treated with an acid aqueous solution. The results are shown in Table 11 and FIG. 6 where these cells are indicated by the symbol ▲.

The low-temperature discharge rate was calculated in the same manner as in Experiment 8.

TABLE 11

| cells | positive electrodes | negative electrodes | negative electrode remaining capacity rates (%) | low-temperature discharge rates (%) |
|---|---|---|---|---|
| A17 | p13 | n10 | 43.6 | 81 |
| A18 | p14 | n10 | 31.0 | 76 |
| A16 | p10 | n10 | 23.4 | 72 |
| A19 | p15 | n10 | 23.9 | 66 |
| A20 | p16 | n10 | 40.4 | 79 |

Table 11 and FIG. 6 indicate that in the cells indicated by the symbol ● whose negative electrodes contain hydrogen-absorbing alloys which have not been surface-treated with acid, the low-temperature discharge rates remarkably decrease with a decrease in the negative electrode remaining capacity rates. In contrast, in the cells indicated by the symbol ▲ whose hydrogen-absorbing alloy negative electrodes have been surface-treated with an acid aqueous solution, the decrease in the low-temperature discharge rates are small even when the negative electrode remaining capacities are lower than 40%. This result indicates that the low-temperature discharge characteristic as well as the cycle characteristic at a normal temperature can be improved by using a hydrogen-absorbing alloy which has been surface-treated with acid and making the negative electrode remaining capacity rate at 40% or lower. The reason for the successful improvement of these characteristics is believed that the surface treatment with acid makes the active surface of the alloy be fully exposed, thereby enhancing the reactivity of the positive electrode.

<Experiment 10>

The relationship between the pH in the surface treatment with acid and the low-temperature discharge rate was examined by using Cells A10 and A21–A26 listed in Tables 4 and 12 which used hydrogen-absorbing alloys that had been surface-treated with acid solutions having different pH values from each other. The results are shown in Table 12 and FIG. 7.

The low-temperature discharge rate was calculated in the same manner as in Experiment 8.

TABLE 12

| cells | positive electrodes | negative electrodes | pH values | low-temperature discharge rate (%) |
|---|---|---|---|---|
| A22 | p10 | n 8  | 0 | 22 |
| A23 | p10 | n 9  | 0.5 | 65 |
| A16 | p10 | n10 | 1 | 72 |
| A24 | p10 | n11 | 2 | 73 |
| A25 | p10 | n12 | 3.5 | 68 |
| A26 | p10 | n13 | 4 | 39 |
| A9  | p10 | n 4  | no treatment | 35 |

Figure 7:
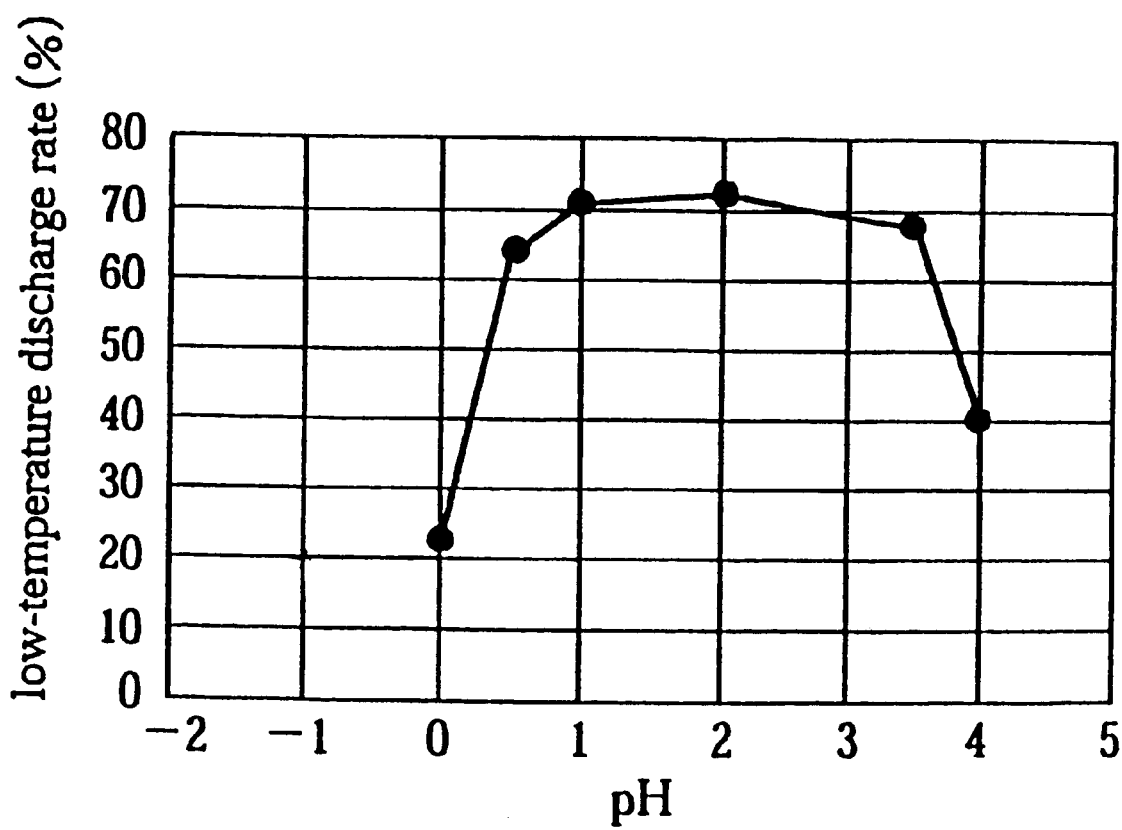
FIG. 7 is a graph which shows the relationship between the pH value in the surface treatment with acid and the low-temperature discharge rate.

Table 12 and FIG. 7 indicate that the low-temperature discharge rate is low when the pH values of the acid solutions are within a range of 0.5 to 3.5.

As explained hereinbefore, a storage cell having a high capacity and a small rise in the cell internal pressure can be manufactured by combining the following positive and negative electrodes. The positive electrode is a non-sintered type high-performing nickel positive electrode which has a non-reactive capacity rate of 16% or lower and contains nickel hydroxide whose particle surfaces are coated with cobalt coating layers. The negative electrode is a hydrogen-absorbing alloy electrode having a capacity to allow the charge depth to be 80% or below.

The performance of the above-mentioned storage cell can be further enhanced by the following construction: The average valence of the cobalt compound which forms the cobalt coating layer is set at larger than divalence, the hydrogen-absorbing alloy as the negative electrode active material is subjected to a surface treatment with an acid solution, and the negative electrode remaining capacity is set at 40% or below of the actual cell capacity. The reason for this enhancement is as follows: When the cobalt-coated nickel active material containing a cobalt compound whose average valence is larger than divalence is used, the storage cell has a high utilization rate and a small non-discharge capacity, so that the negative electrode remaining capacity decreases. In addition, when a hydrogen-absorbing alloy is subjected to a surface treatment with acid, its reactivity is improved so that a large discharge capacity can be taken out even at a low temperature.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A nickel-metal hydride storage cell comprising:
   a non-sintered nickel positive electrode which is filled with a cobalt-coated nickel active material, the cobalt-coated nickel active material including mother particles exclusively or mainly composed of nickel hydroxide, and cobalt compound layers partly or entirely coating surfaces of the mother particles;

a metal hydride negative electrode which is filled with a hydrogen-absorbing alloy which absorbs and desorbs hydrogen; and an electrolyte which includes an alkali aqueous solution, wherein a positive electrode non-reactive capacity rate is 16% or lower and a negative electrode charge depth is 80% or lower after an initial charge/discharge operation;

said positive electrode non-reactive capacity rate being determined by a following equation 1:

positive electrode non-reactive capacity rate %=(positive electrode theoretical capacity−actual cell capacity)/positive electrode theoretical capacity×100    Eq. 1; and said negative electrode charge depth being determined by a following equation 2:

negative electrode charge depth %=(negative electrode remaining capacity+actual cell capacity)/negative electrode whole capacity×100    Eq. 2.

2. The nickel-metal hydride storage cell of claim 1, wherein an average valence of a cobalt compound which is contained in said cobalt compound layers is larger than divalence.

3. The nickel-metal hydride storage cell of claim 1, wherein said negative electrode remaining capacity is 40% or lower of an actual cell capacity, and a surface of said hydrogen-absorbing alloy has been treated with an acid aqueous solution.

4. The nickel-metal hydride storage cell of claim 3, wherein an average valence of a cobalt compound which is contained in said cobalt compound layers is larger than divalence.

5. A method of manufacturing a nickel-metal hydride storage cell, said method comprising:

a first step of producing a cobalt-coated nickel active material by dispersing mother particles exclusively or mainly consisting of nickel hydroxide into a cobalt compound-contained solution, and by precipitating a cobalt compound by adding an alkali solution to the cobalt compound-contained solution with a pH value being adjusted;

a second step of applying a heat treatment to said cobalt-coated nickel active material by adding an alkali metal solution to said cobalt-coated nickel active material and by heating said cobalt-coated nickel active material in a presence of oxygen;

a third step of producing a non-sintered nickel positive electrode whose non-reactive capacity rate is 16% or lower, by using said cobalt-coated nickel active material containing the cobalt compound which has been heat-treated in the second step, said positive electrode non-reactive capacity rate being determined by a following Equation 1:

positive electrode non-reactive capacity rate %=(positive electrode theoretical capacity−actual cell capacity)/positive electrode theoretical capacity×100    Eq. 1; and a fourth step of assembling a nickel-metal hydride storage cell whose negative electrode charge depth after an initial charge/discharge operation is restricted to 80% or lower, by using said non-sintered nickel electrode and a metal hydride negative electrode which is filled with a hydrogen-absorbing alloy, said negative electrode charge depth being determined by a following Equation 2:

negative electrode charge depth %=(negative electrode remaining capacity+actual cell capacity)/negative electrode whole capacity×100    Eq. 2.

6. The method of claim 5, wherein the heat treatment in the second step is conducted for the purpose of making an average valence of the cobalt compound contained in said cobalt-coated nickel active material be larger than divalence.

7. The method of claim 6, wherein the concentration of alkali used in the second step is within a range of 15 to 40 wt %.

8. The method of claim 7, wherein the heat treatment in the second step is conducted at temperatures within a range of 50 to 150° C.

9. The method of claim 5, wherein when said negative electrode remaining capacity is 40% or lower of said actual cell capacity, a surface of the hydrogen-absorbing alloy to be used has been treated with an acid aqueous solution.

10. The method of claim 9, wherein the pH value of said acid aqueous solution is within a rang of 0.5 to 3.5.

11. The method of claim 10, wherein the heat treatment in the second step is conducted for the purpose of making an average valence of the cobalt compound contained in said cobalt-coated nickel active material be larger than divalence.

12. The method of claim 11, wherein the concentration of alkali used in the second step is within a range of 15 to 40 wt %.

13. The method of claim 12, wherein the heat treatment in the second step is conducted at temperatures within a range of 50 to 150° C.

* * * * *

UNITED STATES PATENT AND TRADEMARK OFFICE
CERTIFICATE OF CORRECTION

PATENT NO.     : 6,368,748 B1
DATED          : April 9, 2002
INVENTOR(S)    : Masao Takee et al.

It is certified that error appears in the above-identified patent and that said Letters Patent is hereby corrected as shown below:

Column 2,
Line 18, please delete "a alkaline" and replace with -- an alkaline- -.

Column 4,
Line 16, please delete "capacity CV)" and replace with -- capacity (y) --.

Column 6,
Line 23, please delete "capacity (v)" and replace with -- capacity (y) --;
Line 46, delete "4 wt%" and replace with -- 40 wt% --.

Column 7,
Line 7, please delete "p1" and replace with -- p10 --;
Lines 37 and 40, please delete "hydroxide power" and replace with -- hydroxide Powder --.

Column 9,
Line 11, the phrase "Negative electrodes containing a hydrogen-absorbing alloy which has not been surface-treated with acid" is a caption, therefore, please start a new line with "Commercially available Misch metan (Mn)...high-frequency melting furnace.";
Line 18, please delete "Mno.$_6$ was" and replace with -- Mn$_{0.6}$ was --;
Line 54, please delete "alloy powers" and replace with -- alloy powders --.

Column 11,
Line 22, please delete "50 mAb/g," and replace with -- 50 mAh/g --;
Line 30, please delete "overcharging" and replace with -- overdischarging --;
Line 33, please delete "overcharge" and replace with -- overdischarge --.

UNITED STATES PATENT AND TRADEMARK OFFICE
CERTIFICATE OF CORRECTION

PATENT NO. : 6,368,748 B1
DATED : April 9, 2002
INVENTOR(S) : Masao Takee et al.

It is certified that error appears in the above-identified patent and that said Letters Patent is hereby corrected as shown below:

Column 16,
Line 34, please delete "there cells" and replace with -- these cells --.

Signed and Sealed this

Nineteenth Day of November, 2002

Attest:

Attesting Officer

JAMES E. ROGAN
Director of the United States Patent and Trademark Office